US006643314B2

(12) United States Patent
Szarmes (10) Patent No.: US 6,643,314 B2
(45) Date of Patent: Nov. 4, 2003

(54) PHASE LOCKED FREE ELECTRON LASER WITH RATIONAL MODE LOCKING (75) Inventor: Eric Brent Szarmes, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 22 days.

(21) Appl. No.: 10/081,416

(22) Filed: Feb. 22, 2002

(65) Prior Publication Data

US 2002/0181535 A1 Dec. 5, 2002

Related U.S. Application Data (60) Provisional application No. 60/271,872, filed on Feb. 26, 2001, and provisional application No. 60/271,873, filed on Feb. 26, 2001.

(51) Int. Cl.[7] .............................................. H01S 3/081
(52) U.S. Cl. .............................. 372/92; 372/2; 372/98; 372/105; 372/20; 372/18
(58) Field of Search ................................ 372/92, 98, 9, 372/2, 27, 105, 20, 18

(56) References Cited

U.S. PATENT DOCUMENTS

2002/0181535 A1 * 12/2002 Szarmes ...................... 372/92
2002/0191650 A1 * 12/2002 Madey et al. ................. 372/2

* cited by examiner

Primary Examiner—Leon Scott, Jr.
(74) Attorney, Agent, or Firm—Duane Morris LLP (57) ABSTRACT

A compound intercavity interferometer for a free-electron laser (FEL) comprising at least two beam splitters positioned at a predetermined angles with respect to optical pathways. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

26 Claims, 4 Drawing Sheets

PHASE LOCKED FREE ELECTRON LASER WITH RATIONAL MODE LOCKING

RELATED APPLICATIONS

The present invention claims priority from U.S. Provisional Application No. 60/271,872 filed Feb. 26, 2001 and U.S. Provisional Application No. 60/271,873 filed Feb. 26, 2001.

FIELD OF THE INVENTION

The present invention relates to free electron lasers.

BACKGROUND OF THE INVENTION

The following references are cited in this background to better illustrate the background of the invention:

Ref. 1 U.S. Pat. No. 3,822,410 issued to Madey for "Stimulated Emission of Radiation in a Periodically Deflected Electron Beam";

Ref. 2 J. M. J. Madey, "Stimulated Emission of Bremsstrahlung in a Periodic Magnetic Field," *J. Appl. Phys.*, vol. 42, pp. 1906–1913, 1971;

Ref. 3 J. M. J. Madey, D. A. G. Deacon, L. R. Elias, and T. I. Smith, "An Approximate Technique for the Integration of the Equations of Motion in a Free-Electron Laser," *Il Nuovo Cimento*, vol. 51B, pp. 53–69, 1979;

Ref. 4 W. B. Colson, *Free Electron Laser Theory*, Ph.D. Dissertation, Stanford, Calif.: Department of Physics, Stanford University, 1977;

Ref. 5 N. M. Kroll, P. L. Morton, and M. N. Rosenbluth, "Free-Electron Lasers with Variable Parameter Wigglers," *IEEE J. Quantum Electron.*, vol. QE-17, pp. 1436–1468, 1981;

Ref. 6 ibid;

Ref. 7 C. A. Brau, *Free-Electron Lasers*, Boston, Mass.: Academic Press, 1990; pp. 236–255;

Ref. 8 op. cit., ref. 3;

Ref. 9 op. cit., ref. 5;

Ref. 10 op. cit., ref. 7; pp. 255–258;

Ref. 11 O. K. Crisafulli, E. B. Szarmes, and J. M. J. Madey, "Use of Inverse-Tapering to Optimize Efficiency and Suppress Energy Spread in an rf-Linac Free-Electron Laser Oscillator," *IEEE J. Quantum Electron.*, vol. 37, pp.993–1007, 2001;

Ref. 12 U.S. Pat. No. 4,641,103 issued to Madey et al. for "Microwave Electron Gun"; and Ref. 13 U.S. Pat. No. 5,130,994 issued to Madey et al. for "Free-electron laser oscillator for simultaneous narrow spectral resolution and fast-time resolution spectroscopy.".

A free-electron laser is a device used to convert the kinetic energy of a beam of relativistic free electrons to electromagnetic radiation in the wavelength region between the mm-wave region in radio spectrum and the extreme ultraviolet region at optical wavelengths (Ref. 1). As is known in the art, free-electron lasers work by exploiting the interaction between a beam of relativistic electrons moving through a spatially oscillating transverse magnetic field and a co-propagating beam of electromagnetic radiation (Ref. 2).

In the presence of a strong optical field whose phase matches the phase of the transverse oscillations induced by the transverse magnetic field, the electrons' trajectories in phase and energy are governed by a pair of coupled equations which can be reduced to the pendulum equation (Ref. 3; Ref. 4). The existence of a series of fixed points and an associated set of stable, closed, periodic orbits ("buckets") in the phase space trajectories followed by the electrons in such a system has led to the development of a range of methods for enhancement of the power output that can be obtained from such devices (Ref. 5).

The principal method for enhancement of free-electron laser power output and efficiency employed to date has been the deceleration of the electrons circulating in the periodic orbits around the stable fixed points in their phase space trajectories by decreasing the period and/or amplitude of the spatially oscillating magnetic field as a function of position along the interaction region (Ref. 6; Ref. 7). This method has yielded only limited improvements in power output, and has the further disadvantage of failing to extract a significant amount of energy from the electrons moving along the open trajectories outside the region of phase stability, leaving the electrons emerging from the interaction distributed over a range of energies as large as 10% or more. Independent of the limited enhancement in power output attainable by this method, the large energy spread induced by this method has complicated attempts to recover the residual kinetic energy of the spent electrons, and made it impossible to operate more than one free-electron laser at a time using a single beam of electrons.

The expense of the accelerator systems required to produce the electron beams required for free-electron laser operation and the intense ionizing radiation produced by the spent electrons emerging from the interaction region if not decelerated have constituted major practical barriers to the further development and commercialization of free-electron lasers. The invention described herein overcomes these barriers by exploiting a different lasing mechanism, phase displacement (Ref. 8; Ref. 9; Ref. 10), in which the kinetic energy of electrons moving through an interaction region defined by a spatially oscillating transverse magnetic field and a co-propagating beam of electromagnetic radiation is converted to light by facilitating the deceleration of the electrons to lower energies along the open trajectories outside and between the regions of phase stability ("buckets"). By permitting deceleration of nearly all the electrons in the beam by nearly the same increment, this method provides greater laser power output than previously attainable by converting a greater fraction of the electrons average energy to electromagnetic radiation, while dramatically reducing the spread in energy induced by the interaction thereby simplifying the transport and recovery of the residual kinetic energy of the spent electron beam and reducing the risk of production of hazardous ionizing radiation during operation.

Accordingly, the invention described herein provides a means to enhance the power output, efficiency and flexibility of free-electron lasers while reducing their cost and complexity and the cost of the ancillary radiation shielding required to insure operator and public safety. These improvements are important to currently established and existing uses for free-electron lasers including laser surgery and diagnostics, materials processing, spectroscopy and remote sensing, laser power beaming, and high power laser weapons systems.

Although certain aspects of the phase displacement lasing mechanism were anticipated in the earlier publications, the inventors were the first to rigorously examine the operation of systems based on this mechanism under the conditions prevailing in practical use in which lasers must start from noise in the small signal regime, evolve naturally to achieve the conditions required for effective conversion of electron kinetic energy to light, and stably maintain these parameters for a useful interval of time (Ref. 11). In the course of this new and unanticipated investigation, the inventors were able to establish that such systems, properly designed, could start from noise and evolve naturally to a stable operating configuration compatible with enhanced power output and reduced output energy spread. However, the inventors have also discovered a new instability capable of disrupting laser operation outside a specific range of operating conditions, and have further established that this instability may be suppressed by limiting the growth of the spectral components of the optical field which mediate the instability.

DETAILED DESCRIPTION OF VARIOUS EXEMPLARY EMBODIMENTS

As used herein, the following terms have the following meanings:

| | |
|---|---|
| "magnetic field generator" | a device capable of creating a spatially oscillating transverse magnetic field of predetermined period and amplitude, both of which may vary with position along the axis of the magnetic field generator. The magnetic field generator is interposed in the path of the electron beam generated by an electron beam generator whereby exchange of energy between the electron beam and a co-propagating optical beam is facilitated by interaction between the transverse electron velocity and the transverse optical electric field. By way of example and not limitation, a magnetic field generator may be a wiggler or undulator as these terms are understood by those of ordinary skill in the FEL arts. |
| "interaction region" | a region in vacuum disposed longitudinally along the direction of the electron beam in which the co-propagating electron and optical beams are overlapped with the magnetic field generated by the magnetic field generator and/or the phase displacement device. In some embodiments, there may be one or several distinct interaction regions disposed along the electron beam, or one or several distinct interaction regions disposed within an optical cavity. |
| "separatrix" | a closed trajectory in electron longitudinal phase space (where phase space coordinates are defined by the energy and longitudinal position of an electron in the electron beam) which separates the open-orbit electron trajectories from the closed-orbit electron trajectories in phase space. The separatrices are determined by the magnitude and spatial dependence of the magnetic field generated by the magnetic field generator together with the electric field of the co-propagating optical beam, independently of the electron beam. |
| "resonant energy" | the energy of the stable points in electron longitudinal phase space. |
| "synchrotron frequency" | the frequency at which electrons, located on closed-orbit trajectories about the stable points within the separatrices, undergo successive revolutions in phase space. |
| "phase displacement device" | a device that is capable of increasing the resonant energy relative to the energy of an electron in the electron beam during the interaction of the electron with the optical beam in the interaction region. In some embodiments, the phase displacement device could be incorporated in the structure of the magnetic field generator. In other embodiments, the phase displacement device could be a device which is distinct from the magnetic field generator. |
| "small-signal regime" | of laser oscillation; the period of time after initial generation of the laser beam when the stable fractional increase of laser power after each complete round trip in the optical cavity is substantially constant over successive round trips. By way of example and not limitation, the small-signal regime is characterized by electron energy perturbations which are substantially smaller than the height of the phase space separatrices. |
| "small-signal gain" | the fractional increase of laser power after a single pass through the interaction region in the small-signal regime. |
| "saturated regime" | of laser oscillation; the state of dynamic equilibrium, established following the initial growth of the intensity of the optical field, in which the stable fractional increase of laser power after each complete round trip in the optical cavity has decreased to substantially negligible proportions compared to the fractional increase of laser power in the small-signal regime. By way of example and not limitation, the saturated regime is characterized by electron energy perturbations which are a substantial fraction of the height of the phase space separatrices. |
| "saturated gain" | the fractional increase of laser power after a single pass through the interaction region in the saturated regime. |

In the figures, a general reference to a device or element is indicated by a numeral, e.g. "X" and two or more specific instances of the device or element is indicated by a trailing letter, e.g. "Xa." By way of example, as used herein, a crystal is generally referred to by the numeral "90" while two or more crystals will be referred to individually as "90*a*," "90*b*," and the like.

Figure 1:
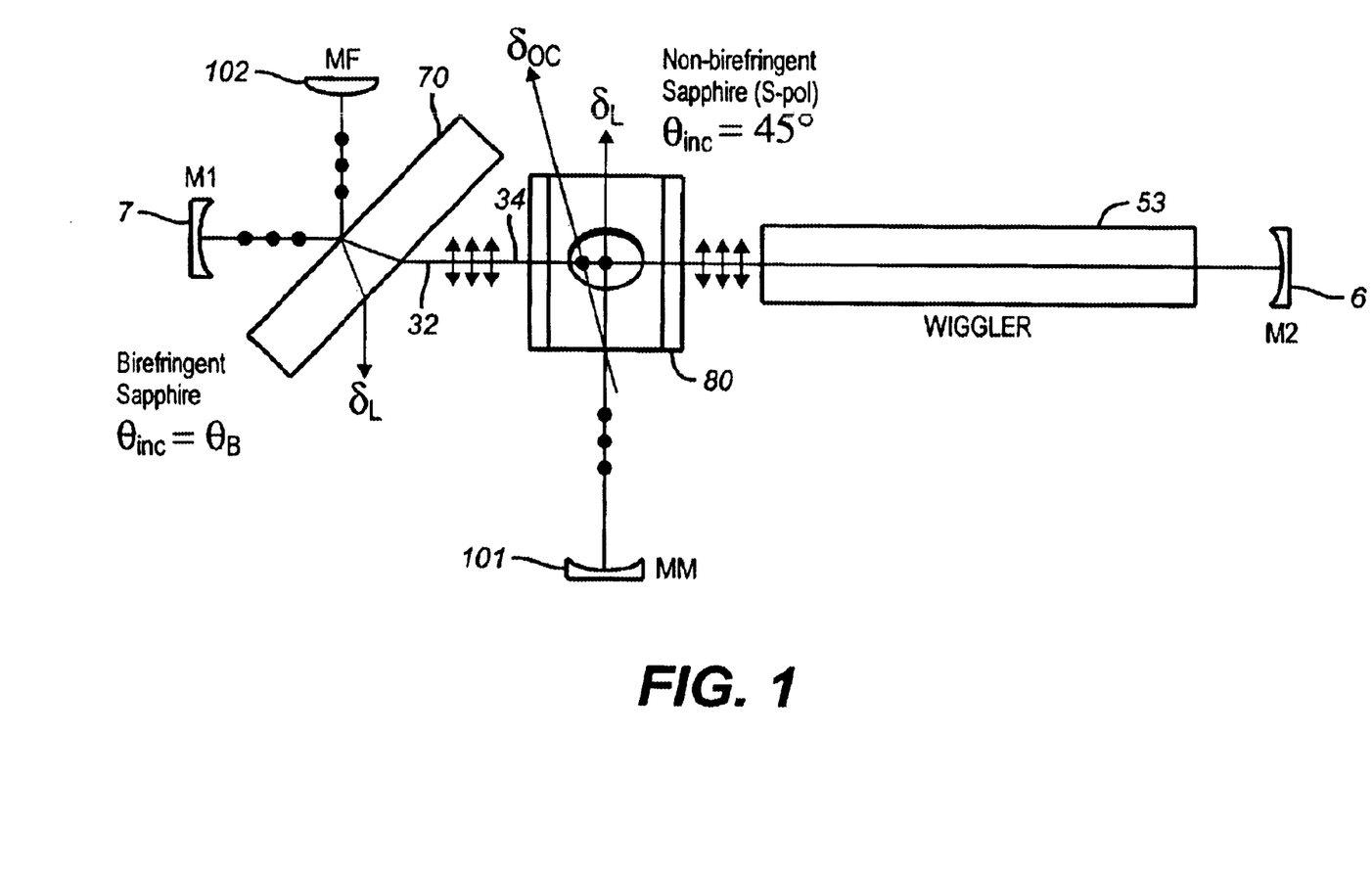
FIG. 1 is a schematic view of an exemplary compound interferometer disposed within a free electron laser.

Referring now to FIG. 1, compound intercavity interferometer 15 suitable for use in a free electron laser (referred to herein by the numeral "10" or by "FEL 10") comprises output coupler 80 disposed at a predetermined angle with respect to optical axis 34 and optical filter 70 disposed at a predetermined angle with respect to optical axis 35 where optical axis 35 defines a path for optical energy within FEL 10 from output coupler 80 to optical filter 70. An FEL of this type is described in U.S. patent application Ser. No. 10/081,577, filed concurrently herewith and incorporated by reference herein.

Figure 2:
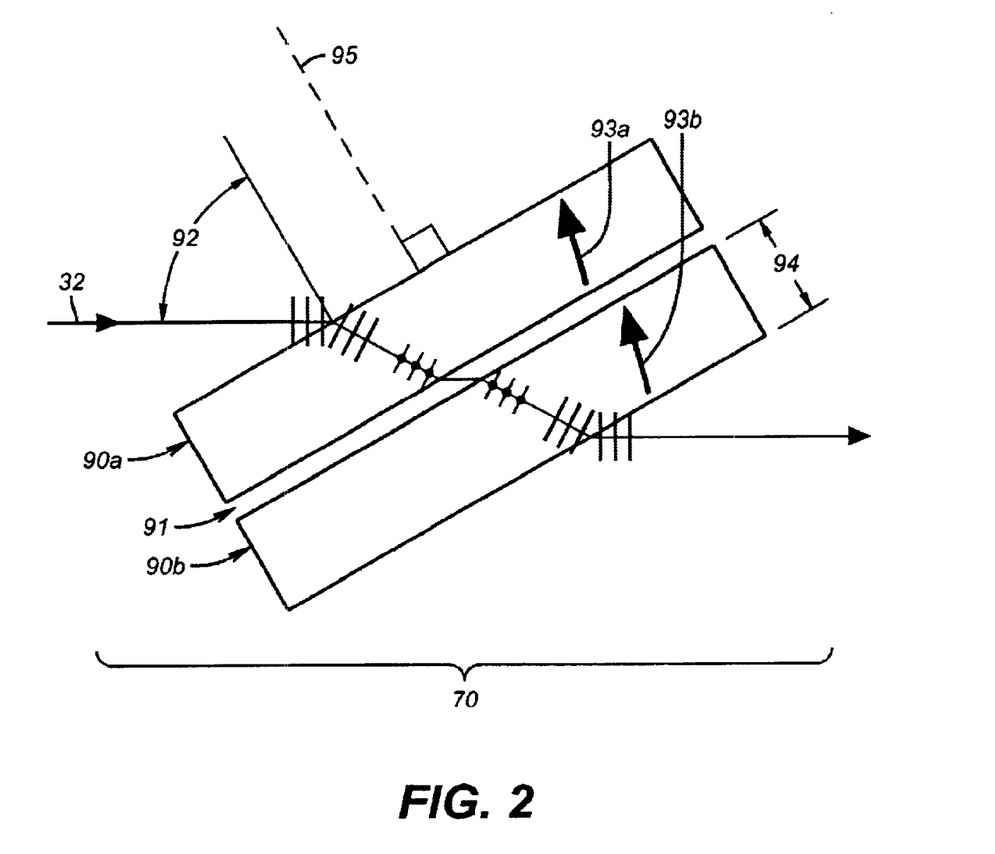
FIG. 2 is a schematic view of a preferred embodiment of an optical beam spectral filter.

Referring now to FIG. 2, in a certain contemplated embodiment, optical filter 70 comprises two parallel, uncoated birefringent crystals 90*a*,90*b* enclosing a variable-space vacuum gap 91 (FIG. 2). Crystal 90 may comprise quartz, sapphire, or the like, or equivalents thereof.

The primary filter function is provided by vacuum gap 91 which forms a Fabry-Perot etalon, and the birefringent crystals 90*a*,90*b* are employed to provide additional spectral selectivity by altering the reflectance of either the resonant or off-resonant wavelengths in vacuum gap 91. The characteristics of this embodiment of the optical filter include angle of incidence 92 with respect to optical beam 32 (which angle equals the Brewster angle in the preferred embodiment), the size of vacuum gap 91, the direction of crystal c-axis 93a, 93b, and crystal thickness 94. In a preferred embodiment, these characteristics are chosen so that the birefringent passband for each birefringent crystal 90 is equal to the passband of vacuum gap 91.

Characteristics of output coupler 80 and optical filter 70, including size of vacuum gap 91, orientation of crystals 90, and thickness of crystals 90, may be chosen so that a birefringent passband for each birefringent crystal 90 is approximately equal to a gap passband between the birefringent crystals 90.

In a currently envisioned embodiment, the passband of vacuum gap 91 is chosen to appropriately suppress the spectral components which mediate the coupled electron-optical beam instability that can disrupt the operation of FEL 10.

As depicted in FIG. 2, optical filter 70 may be rotated about surface normal 95 to vary the degree of birefringence in crystals 90, and vacuum gap 91 may be tunable using piezoelectric gap tuning.

In the operation of exemplary embodiments, enhanced optical performance may be obtained in FEL 10 at a modulation frequency $v_{rf}$ to achieve a desired configuration of non-integral harmonic mode locking. As used herein, "enhanced optical performance" comprises at least one of increased optical pulse repetition rates and increased spectral brightness.

Cavity axial mode spacing $v_{cav}$ is first determined and then an integer N selected for a value of N that substantially corresponds to a predetermined number of radio frequency (rf) periods contained in a cavity round trip. An integer value P is then selected that substantially corresponds to a predetermined fractional deviation from a predetermined integral harmonic mode locking. With these values, a modulation frequency $v_{rf}$ may be calculated using the formula $$v_{rf} = (N*1/P)v_{cav} \quad [1]$$

$v_{cav}$ may be calculated by determining a spacing L between first end mirror 6 and second end mirror 7. Using L, $v_{cav}$ may be calculated as $$v_{cav} = c/2L \quad [2]$$

where c is the speed of propagation of light.

The value of N may be further selected to be the nearest integer for which an integral harmonic mode locking would be achieved.

Additionally, P may be selected to be either the number of round trips which circulating optical pulses must execute in order to synchronize with an injected electron pulse in a time domain or axial mode spacing between modes of a predetermined hypermode in a frequency domain. If a frequency domain is used to select a value for P, P may be calculated in the frequency domain using the formula $$v_{ax}(\text{hypermode}) = P*v_{rf} \quad [3]$$

A phase locked FEL 10 may be obtained with rational mode locking by determining a value for the size of vacuum gap 91. For embodiments where crystals 90 comprise sapphire, an orientation value for each sapphire crystal 90a,90b may be obtained as well as thickness value for each sapphire crystal 90a,90b such that a birefringent passband for each sapphire crystal 90a,90b is approximately equal to a desired gap passband.

Actual size of vacuum gap 91, orientation of crystals 90, and thickness of crystals 90 may then be adjusted such as by using the vacuum gap size value, crystal orientation value, and crystal plate thickness value obtained. Once adjusted, compound intercavity interferometer 15 may then be inserted into optical axis 34 in FEL 10 at substantially the Brewster angle with respect to optical axis 34.

Optical filter 70 may be tuned by rotating optical filter 70 to a predetermined position with respect to optical axis 34 to vary the degree of birefringence. Tuning may be by numerous equivalent means as will be understood by those of ordinary skill in the FEL arts, by way of example and not limitation including tuning vacuum gap 91 using piezoelectric gap tuning.

Compound intercavity interferometer 15 may be used to increase spectral brightness and/or spectral purity of tunable, radio frequency linearly accelerated (rf linac) FELs. Combined with pulsed electron-beam excitation (mode locking) of a high gain free-electron, to produce an output train of substantially phase-coherent laser pulses whose repetition rate substantially equals an integer multiple of the electron pulse repetition rate.

Referring back to FIG. 1, in a preferred embodiment, second interferometer 102 is a nested Fox-Smith interferometer within a Michelson interferometer first interferometer 101. First interferometer 101 may be either a birefringent or a non-birefringent Michelson interferometer. Spacing between mirrors 6,7 may be calculated to effect a spacing in which successive optical pulses in a pulse train are overlapped at a predetermined interval in compound intercavity interferometer 15.

Figure 3A:
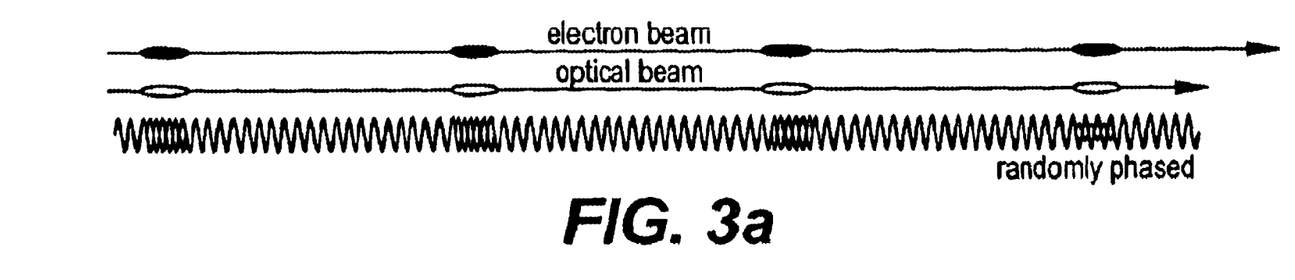
FIGS. 3*a* and 3*b* are graphical representations of randomly phased and phase locked electron and optical beams.
Figure 3B:
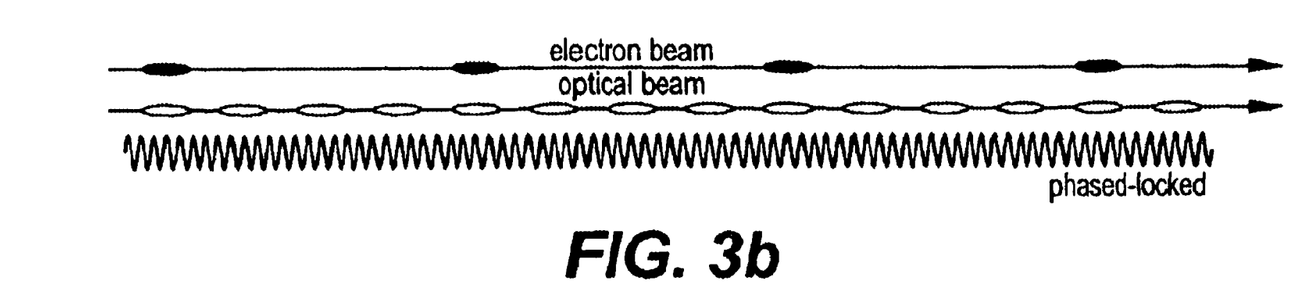

Referring now to FIG. 3a, randomly phased optical output from a two-mirror, rf linac FEL may produce optical energy as shown. When using compound intercavity interferometer 15 with non-integral harmonic mode locking as well as phase locking, the results shown in FIG. 3b may be achieved.

Figure 4A:
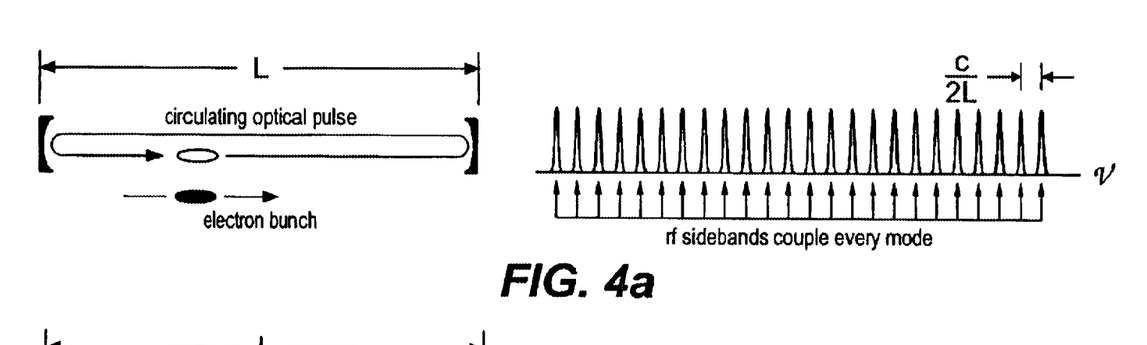
FIGS. 4*a*, 4*b*, and 4*c* are graphical representations of results from operating in a non-integral harmonic mode locking as well as phase locking.
Figure 4B:
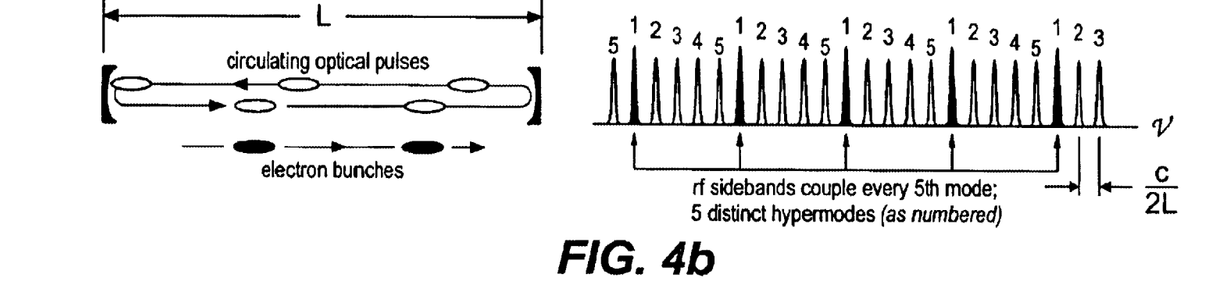
Figure 4C:
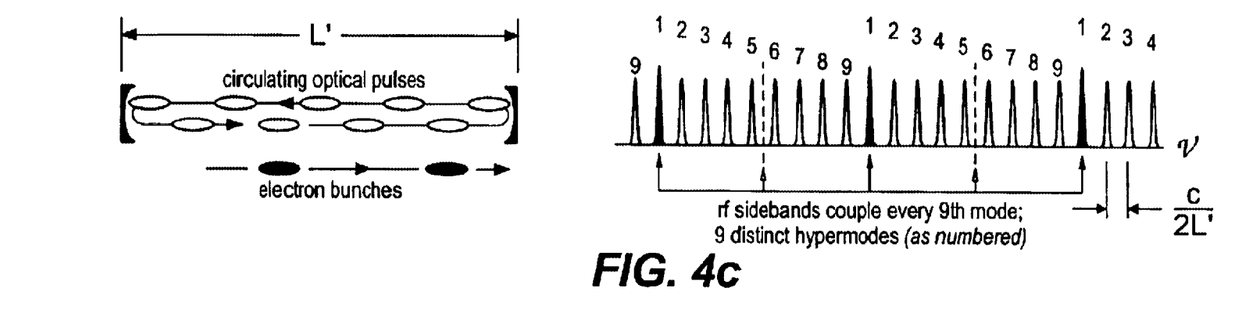

Referring now to FIG. 4, in an FEL 10 containing a single optical pulse, the cavity round-trip time equals the rf frequency and the optical pulse remains synchronized with the electron pulse on each pass. In the frequency domain, the electron bunches modulate the cw axial modes of the resonator, as these terms will be familiar to those of ordinary skill in the laser arts, and the modulation sidebands overlap and injection lock (couple) the adjacent cavity modes. In a harmonically mode locked FEL 10 in which the rf modulation frequency is N times the cavity round trip frequency, N circulating optical pulses build up in the cavity. In the frequency domain, the rf sidebands on each cw axial mode overlap and injection lock every Nth cavity mode, yielding N interleaved sets of independently coupled axial modes (N hypermodes).

The independent oscillation of each hypermode reflects the random phases of the circulation optical pulses in the time domain (in which the pulses start up from noise). In the non-integral harmonically mode locked FEL 10, the cavity is shortened slightly in such a way as to require each circulating optical pulse to undergo two or more round trips before it couples again to an electron pulse. In the frequency domain, the rf sidebands on the axial modes overlap do not couple the axial modes one rf spacing away (because of the mismatch), but they do couple the axial modes displaced by a proportionately increased spacing. Thus, as illustrated in FIG. 4c, it can be seen that there are nine, as opposed to five, independent hypermodes (FIG. 4b) and the axial mode spacing within each hypermode is now twice the rf frequency. By employing an intracavity interferometer to suppress all but one of the hypermodes, the effect is to allow only a single hypermode to oscillate, with axial modes separated by an integral multiple of the electron pulse repetition rate, e.g. two or more, yielding (e.g., such as by Fourier transformation) an output pulse train of phase locked optical pulses at the corresponding multiple of the rf frequency.

The modulation frequency $v_{rf}$ which must be applied to achieve a specific configuration of non-integral harmonic mode locking may be determined using three parameters. First, the cavity axial mode spacing may be defined by the two primary end mirrors 6,7 using the equation $$v_{cav} = c/2L \qquad [4]$$

Second, an integer N may be selected corresponding to an approximate number of rf periods contained within one cavity round trip, where N is the nearest integer for which integral harmonic mode locking would be achieved. Third, an integer P may be selected to represent the fractional deviation from integral harmonic mode locking. In the time domain, P may be selected as the number of round trips which is the circulating optical pulses must execute in order to synchronize again with an injected electron pulse. In the frequency domain, the integer P may be selected by determining the axial mode spacing between the modes of a given hypermode using the following equation:

$$v_{ax}(\text{hypermode}) = P^* v_{rf} \qquad [5]$$

The modulation frequency $v_{rf}$ may then be calculated as $$v_{rf} = (n - (1/P)) v_{cav} \qquad [6]$$

Non-integral harmonic mode locking has fundamental implications for the design and operation of FEL 10. If the optical pulses undergo several round trips between their interaction with the electron pulses, then the equivalent cavity losses will be increased by a factor equal to the number of such round trips. However, if the cavity losses are adjusted, i.e. reduced, specifically to maintain a net electronic gain and a predetermined degree of saturation of FEL 10 after P round trips, then the laser turn-on time will scale linearly with P. Thus, the following will hold true:

If $P=1$: $(1+G_{net}) = (1+G_{elec})*[1-d_{cav}]$ \qquad [7]

If $P>1$: $(1+G_{net}) = (1+G_{elec})*[1-d_{cav}^{1/P}]^P$ \qquad [8]

The increased turn-on time has fundamental implications for the injector and accelerator technology which must be able to deliver proportionately longer macropulses.

Of particular importance for spectroscopy, if cavity losses, and fractional output coupling, are adjusted according to the present invention, the average output power at saturation will be preserved. Thus, if P=1, the optical energy from each electron bunch may be outcoupled in a single pass. On the other hand, if P>1, the optical energy from each electron bunch may be outcoupled in P passes, but the average power is compensated by the output optical pulse repetition rate which is then P times higher. Therefore, in the optical spectrum the reduction of the number of axial modes by a factor of P will be accompanied by an increase in their spectral brightness by the same factor.

The intracavity power, however, scales linearly with P, due to the reduced cavity losses required to achieve the same degree of saturation, so that mirror technology or special resonator geometries may also be developed to survive the increased circulating fluences.

In the prior art, the high average power and broad tunability of an FEL discourages intracavity interferometers of any kind, because the circulating intensities or fluences in these lasers can easily exceed the damage thresholds of typical dielectric coatings used to fabricate the intracavity beam splitter, especially if the coating is extremely broadband. A solution which has been discovered by the inventors employs an extremely broadband, tunable birefringent beam splitter that proves sufficient reflectance without the use of any coatings. In a preferred embodiment, as discussed herein above, sapphire crystal 90 may be used in accordance with the present invention where sapphire crystal 90 is inclined near the Brewster angle with respect to optical axis 34. Sapphire crystal 90 may use S-polarized (TE) reflection at one of its surfaces to prove the coupling in compound intercavity interferometer 15. For practical angles of incidence greater than the Brewster angle, reflectances up to 45% can be obtained. Prohibitive cavity losses at the second surface may be reduced if not eliminated by exploiting the birefringence to yield P− (TM−) polarization at that surface, resulting in low-loss reflections that are suitable for output coupling.

Unwanted hypermodes may be suppressed by means of a compound Michelson/Fox-Smith interferometer illustrated schematically in FIG. 1. Fox-Smith interferometer 102 portion may be constructed using the birefringent beam splitter of FIG. 2, and Michelson interferometer 101 may be constructed using a non-birefringent sapphire crystal optical filter 70 with its crystal orientation chosen to preserve S-polarization at both surfaces. In the latter, one of the surfaces is used as a beam splitter, and the other is used for output coupling with high damage threshold operation. The relative free-spectral ranges (FSRs) of the Michelson interferometer 101 and Fox-Smith interferometer 102 may be chosen to maximize cavity losses for the nearest non-surviving hypermode. The Fox-Smith FSR may be chosen to yield mode selection within a predetermined range, by way of example and not limitation such as within a narrow a mode as possible. Further, the Michelson FSR may be chosen to equal the rf modulation frequency. In this manner, Michelson interferometer 101 maximally suppresses the Fox-Smith modes which overlap the unwanted hypermodes.

While the present invention has been described above in terms of specific examples, it is to be understood that the invention is not intended to be confined or limited to the examples disclosed herein. On the contrary, the present invention is intended to cover various structures and modifications thereof included within the spirit and scope of the appended claims.

I claim:

1. A compound intercavity interferometer for a free-electron laser (FEL), the FEL further comprising a wiggler disposed intermediate a first mirror and a second mirror and aligned substantially about an optical pathway which defines an optical axis, the compound intercavity interferometer comprising:

a. an optical non-birefringent crystal coupler positioned at a first predetermined angle with respect to the optical axis, the first predetermined angle being substantially equal to $\theta_{INC}$, the optical non-birefringent crystal coupler adapted to receive light at an input, transmit a first portion of the received light to a first interferometer, and transmit a second portion of the received light to a light output of the optical non-birefringent crystal coupler; and b. an optical birefringent crystal filter adapted to receive the second portion of light transmitted by the optical non-birefringent crystal coupler, the optical birefringent crystal filer positioned at a second predetermined angle with respect to the second portion of light, the second predetermined angle being approximately equal to the Brewster angle, the optical birefringent crystal filter further comprising a first surface and a second surface opposite the first surface, the optical birefringent crystal filter adapted to transmit separate portions of light exiting the optical birefringent crystal filter to at least one of a second interferometer, the second mirror, or a light output.

2. A compound intercavity interferometer of claim 1, wherein:
   a. the optical birefringent crystal filter further comprises uncoated birefringment crystal.

3. The compound intercavity interferometer of claim 2 wherein:
   a. the first beam splitter is at least one of (i) a birefringent beam splitter or (ii) a non-birefringent beam splitter; and
   b. the second beam splitter is at least one of (i) a birefringent beam splitter or (ii) a non-birefringent beam splitter.

4. The compound intercavity interferometer of claim 2, wherein:
   a. an S-polarized reflection at the first surface provides an optical coupling to the optical pathway; and
   b. a second surface of the birefringent plate exploits birefringence to yield P-polarization of light entering the birefringent plate from the optical pathway.

5. The compound intercavity interferometer of claim 2, wherein:
   a. the beam splitter comprises a crystal.

6. The compound intercavity interferometer of claim 2, wherein:
   a. the compound intercavity interferometer is rotatable about its surface normal to vary a degree of birefringence.

7. A compound intercavity interferometer of claim 1, wherein:
   a. $\theta_B$ is greater than the Brewster angle.

8. A compound intercavity interferometer for a free-electron laser (FEL) comprising:
   a. a first beam splitter positioned at a predetermined angle with respect to an optical pathway within an FEL, the first beam splitter further comprising a first surface and a second surface opposite the first surface, the first beam splitter adapted to receive light along the optical pathway and further adapted to transmit a predetermined first portion of light incident to the first surface to a first resonator and transmit a second portion of light incident to the first surface through the second surface; and
   b. a second beam splitter positioned at a predetermined angle with respect to the second portion of light, the second beam splitter comprising a first surface and a second surface opposite the first surface such that a predetermined portion of light entering the second beam splitter is transmitted to a second resonator.

9. The compound intercavity interferometer of claim 8, wherein:
   a. the crystal is at least one of (i) sapphire or (ii) quartz.

10. The filter of claim 8, wherein:
    a. the compound intercavity interferometer is tunable using piezoelectric gap tuning.

11. A compound intercavity interferometer for FEL lasers comprising:
    a. a first birefringent plate disposed within the FEL at a predetermined angle; and
    b. a second birefringent plate disposed within the FEL at a predetermined angle, the second birefringent plate disposed substantially parallel to the first birefringent plate;
    c. wherein a first predetermined portion of the first birefringent plate and a second predetermined portion of the second birefringent plate define a vacuum gap disposed intermediate the first birefringent plate and the second birefringent plate.

12. The compound intercavity interferometer of claim 11, wherein:
    a. at least one birefringent plate comprises uncoated birefringment sapphire.

13. A resonator for a free-electron laser (FEL) comprising:
    a. a first mirror aligned along a first optical pathway disposed at least partially within the FEL;
    b. a second mirror disposed at a predetermined position at least partially in the FEL opposite the first mirror;
    c. a wiggler disposed in the FEL intermediate the first mirror and the second mirror and aligned substantially about the optical pathway; and
    d. a compound intercavity interferometer, further comprising:
       i. a birefringent plate disposed within the FEL substantially about the optical pathway at a predetermined angle relative to the optical pathway;
       ii. a Michelson interferometer able to receive a predetermined portion of light provided by the birefringent plate; and
       iii. a birefringent Fox-Smith laser interferometer nested within the Michelson interferometer;
    e. wherein
       i. an S-polarized reflection at a first surface of the birefringent plate provides an optical coupling in the compound intercavity interferometer for light traveling substantially about the optical pathway;
       ii. a second surface of the birefringent plate exploits birefringence to yield P-polarization;
       iii. a predetermined portion of the light entering the compound intercavity interferometer is diverted to reflect off the second mirror; and
       iv. a predetermined first portion of the light entering the birefringent plate is diverted to the Fox-Smith resonator and a predetermined second portion of the light entering the birefringent plate is diverted to the Michelson resonator.

14. The resonator of claim 13, wherein:
    a. the Michelson resonator is at least one of (i) a birefringent Michelson resonator or (ii) a non-birefringent Michelson resonator.

15. The resonator of claim 13, further comprising:
    a. a non-birefringent interferometer disposed about the pathway intermediate the wiggler and the second mirror.

16. The resonator of claim 15, wherein:
    a. the compound intercavity interferometer is disposed within the FEL substantially at the Brewster angle with respect to the optical pathway.

17. The resonator of claim 13, wherein:
a. the birefringent plate further comprises two parallel uncoated birefringent sapphire substrate plates defining a variable space vacuum gap therebetween.

18. The resonator of claim 17, wherein:
a. vacuum gap size, sapphire crystal orientation, and sapphire thickness are chosen so that a birefringent passband for each birefringent sapphire substrate plate is approximately equal to a gap passband between the birefringent sapphire substrate plates.

19. The resonator of claim 18, wherein:
a. the gap passband is chosen to appropriately suppress FEL sidebands.

20. The resonator of claim 17, wherein:
a. the compound intercavity interferometer is tunable using piezoelectric gap tuning.

21. A method of obtaining enhanced optical performance in a free electron laser (FEL) at a modulation frequency $v_{rf}$ to achieve a desired configuration of non-integral harmonic mode locking for a resonators described in claim 13, comprising:
a. determining a cavity axial mode spacing $v_{cav}$;
b. selecting an integer N that substantially corresponds to a predetermined number of radio frequency (rf) periods contained in a cavity round trip;
c. selecting an integer P that substantially corresponds to a predetermined fractional deviation from a predetermined integral harmonic mode locking;
d. calculating a modulation frequency using the formula $v_{rf}=(N-1/p)v_{cav}$; and
e. using the calculated modulation frequency to operate the FEL.

22. The method of claim 21 wherein step (a) further comprises:
a. determining a spacing L between a first end mirror and a second end mirror in the FEL; and
b. calculating $v_{cav}$ to equal c/2L where c is the speed of propagation of light.

23. The method of claim 21 wherein step (b) further comprises:
a. selecting a value of N as the nearest integer for which integral harmonic mode locking would be achieved.

24. The method of claim 21, wherein P in step (c) comprises at least one of:
a. the number of round trips which circulating optical pulses must execute in order to synchronize with an injected electron pulse in a time domain; and
b. axial mode spacing between modes of a predetermined hypermode in a frequency domain.

25. The method of claim 24 wherein:
a. P is calculated in the frequency domain from $v_{ax}$(hypermode)=$P*v_{rf}$.

26. The method of claim 21, wherein:
a. enhanced optical performance comprises at least one of (i) increased optical pulse repetition rates or (ii) increased spectral brightness.

* * * * *